United States Patent
Averett et al.

(10) Patent No.: US 8,250,518 B2
(45) Date of Patent: Aug. 21, 2012

(54) PER USER FILE ASSOCIATIONS

(75) Inventors: Edward B. Averett, Kirkland, WA (US); Giles Edward Van der Bogert, Kirkland, WA (US); Jerry K. Koh, Redmond, WA (US); Michael G. Sheldon, Seattle, WA (US); Zeke B. Odins-Lucas, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1440 days.

(21) Appl. No.: 11/278,041

(22) Filed: Mar. 30, 2006

(65) Prior Publication Data

US 2007/0240098 A1    Oct. 11, 2007

(51) Int. Cl.
G06F 9/44    (2006.01)

(52) U.S. Cl. ......... 717/100; 717/105; 717/120; 717/121

(58) Field of Classification Search .................. None
See application file for complete search history.

(56) References Cited

U.S. PATENT DOCUMENTS

| | | | | |
|---|---|---|---|---|
| 5,748,963 A * | 5/1998 | Orr | ........... | 717/131 |
| 5,815,717 A * | 9/1998 | Stack | ........... | 717/105 |
| 5,845,293 A * | 12/1998 | Veghte et al. | ........... | 707/202 |
| 5,897,640 A * | 4/1999 | Veghte et al. | ........... | 707/202 |
| 5,987,247 A * | 11/1999 | Lau | ........... | 717/100 |
| 6,008,806 A * | 12/1999 | Nakajima et al. | ........... | 715/744 |
| 6,138,268 A * | 10/2000 | Negoro | ........... | 717/110 |
| 6,145,021 A * | 11/2000 | Dawson et al. | ........... | 710/8 |
| 6,209,125 B1 * | 3/2001 | Hamilton et al. | ........... | 717/125 |
| 6,330,709 B1 * | 12/2001 | Johnson et al. | ........... | 717/100 |
| 6,418,554 B1 * | 7/2002 | Delo et al. | ........... | 717/174 |
| 6,487,713 B1 * | 11/2002 | Cohen et al. | ........... | 717/105 |
| 6,564,369 B1 * | 5/2003 | Hove et al. | ........... | 717/121 |
| 6,868,539 B1 * | 3/2005 | Travison et al. | ........... | 717/100 |
| 7,000,223 B1 * | 2/2006 | Knutson et al. | ........... | 717/121 |
| 7,426,713 B2 * | 9/2008 | Duggan et al. | ........... | 717/100 |
| 7,451,403 B1 * | 11/2008 | Srinivasan et al. | ........... | 715/763 |
| 7,464,263 B2 * | 12/2008 | Cornpropst et al. | ........... | 713/153 |
| 2002/0091990 A1 * | 7/2002 | Little et al. | ........... | 717/105 |
| 2002/0108101 A1 * | 8/2002 | Charisius et al. | ........... | 717/105 |
| 2003/0051230 A1 * | 3/2003 | Molchanov et al. | ........... | 717/120 |
| 2003/0056192 A1 * | 3/2003 | Burgess | ........... | 717/100 |
| 2003/0084096 A1 * | 5/2003 | Starbuck et al. | ........... | 709/203 |
| 2003/0088852 A1 * | 5/2003 | Lacas et al. | ........... | 717/121 |
| 2003/0097485 A1 * | 5/2003 | Horvitz et al. | ........... | 709/313 |
| 2003/0200098 A1 * | 10/2003 | Geipel et al. | ........... | 705/1 |
| 2003/0200532 A1 * | 10/2003 | Gensel | ........... | 717/120 |

(Continued)

OTHER PUBLICATIONS

Young, Margaret. Windows XP: The Complete Reference. Sep. 28, 2001. Osborne/McGraw-Hill. Chapter 3.*

(Continued)

*Primary Examiner* — Thuy Dao
*Assistant Examiner* — Samuel Hayim
(74) *Attorney, Agent, or Firm* — Shook Hardy & Bacon LLP

(57) ABSTRACT

Systems and methods are provided for defining a default handler software application in response to an event at a computer. An event, for example, a user opening a file with a specific extension or accessing a uniform resource locator (URL) with a specific protocol, may trigger the operating system to instantiate a user-level default handler program associated with the event type and the specific user. Users may define user-level default handlers through a centralized user interface maintained by the operating system. During the application installation process, an application may register lists of supported events that the application is capable of handling.

11 Claims, 9 Drawing Sheets

U.S. PATENT DOCUMENTS

| | | | | |
|---|---|---|---|---|
| 2004/0031018 | A1* | 2/2004 | Marty | 717/120 |
| 2004/0216090 | A1* | 10/2004 | Kaler et al. | 717/121 |
| 2004/0225995 | A1* | 11/2004 | Marvin et al. | 717/100 |
| 2004/0255263 | A1* | 12/2004 | Ando | 717/100 |
| 2005/0108678 | A1* | 5/2005 | Goodwin et al. | 717/100 |
| 2005/0198336 | A1* | 9/2005 | Eytchison et al. | 709/230 |
| 2006/0037000 | A1* | 2/2006 | Speeter et al. | 717/120 |

OTHER PUBLICATIONS

Posey, Brian M. Microsoft TechNet [Online]1999 [retrieved on Dec. 16, 2009] retrieved from the Internet: <URL: http://technet.microsoft.com/en-us/library/cc749986(printer).aspx> relevant pp. 1-9.*

Windows Media Player Manual. Copyright 2004 Microsoft Coporation pp. 158-160.*

Madden, Brian, "Creating Custom File Associations to Support Side-by-Sdie Applications" Apr. 20, 2004 TechTarget <http://www.brianmadden.com/blogs/brianmadden/archive/2004/04/20/creating-custom-file-associations-to-support-side-by-side-applications.aspx>.*

"KUDOS Unofficial Kubuntu FAQ—Tips and Tricks" Aug. 14, 2005 <http://kudos.berlios.de/kf/kisimlar/tipsntrix.html> 19 pages.*

Jerry Honeycutt "Microsoft Windows Registry Guide, Second Edition" Microsoft Press 2005, Part IV Appendixes (15 pages extracted).*

Umar Saif, "Opportunistic File-Associations for Mobile Operating Systems", IEEE 2006, <http://ieeexplore.ieee.org/stamp/stamp.jsp?tp=&arnumber=1691718>, pp. 1-6.*

Olga Volgin et al, "Context-aware metadata creation in a heterogeneous mobile environment", ACM 2005, <http://delivery.acm.org/10.1145/1070000/1066002/p75-volgin.pdf>, pp. 1-5.*

L.T. Hoff et al, "Performance Metrics for Object Oriented Front End Computers", International Conference on Accelerator and Large Experimental Physics Control Systems, 1999, <http://accelconf.web.cern.ch/accelconf/ica99/papers/mc1p31.pdf>, pp. 1-2.*

* cited by examiner

PER USER FILE ASSOCIATIONS

BACKGROUND

Aspects of this invention relate to performing default software actions in response to events occurring at a computer. In recent years, the numbers of electronic formats for media files and documents has grown significantly. As computers have become larger and more powerful tools, they have also attempted to become compatible with these various electronic media and document formats. Computers today will typically support many different methods of creating and storing an electronic document. For example, in a typical personal computer, a user who creates a new image file can store that image as a JPEG, GIF, TIFF, PNG, BMP, or any of several other image formats. This abundance of electronic formats also applies for video files, audio files, other document types such as word processing documents, and protocols such as internet and email protocols.

As the number of electronic file and protocol formats has grown, so has the number of software programs installed on the typical personal computer able to view and interact with those files and protocols. A single computer might have several different software programs each capable of interpreting and/or otherwise interacting with various file formats. For example, a user may have many image viewer and editor programs capable of interpreting and displaying a JPEG image.

To prevent user confusion between software applications with similar capabilities, users can associate a default application, or handler, with a specific file type. However, different users of a single computer may each prefer a different default software application for an event. Many current applications and operating system utilities respond to this situation by overwriting one user's default software handler and replacing it with another. For example, as part of the Windows® XP operating system made by Microsoft Corporation, a computer network protocol could have only one default handler that would apply to every user on the computer. Additionally, many applications will carelessly or maliciously overwrite the existing system-level default handler and assign themselves as the system-wide default application for each compatible file type or protocol.

Users attempting to change their default handlers for specific events may encounter several problems. First, a user may not know the file extension or protocol corresponding to an event, and the user may not know every file type and protocol supported by his or her favorite software applications. Second, user-level defaults are not widely used for file extension events (e.g., a user opening up a file with a specific extension), and are not even available for protocol events (e.g., opening up a resource location with a specific protocol) and many other event types, such as certain hardware events. Finally, different users and different applications will often compete for the system-level default handlers, and will frequently overwrite defaults previously set by another user or application.

Referring to FIG. 2, a flowchart is shown illustrating some of these problems. In step 201, User A sets a default handler program for playing digital music on a computer, and in step 203, User A opens a digital music file and plays the file with the default handler. However, in step 205, User B overwrites the system-level default handler set by User A with a different default handler for playing digital music. Thus, User A resets her default handler in step 207, before opening another digital music file in step 209. However, in step 211, an application installed on the same computer by User C overwrites User A's default handler and designates itself as the new system-level default digital music handler, thus prompting User A to once again reset her preferred default handler in step 213 before opening another digital music file in step 215.

SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Various illustrative aspects of the present disclosure are directed to systems and methods for allowing a user to define user-level or system-level default handlers, to associate a software response by an installed software application with a computer event. A computer event, such as a file with a certain file extension being opened on the computer, a resource link associated with a certain protocol being opened on the computer, a hardware device or media being connected to the computer, or other computer event, may be associated with a single application installed on the computer. Multiple applications capable of handling a single event type may be installed on the same computer, and a user may select one application as a default handler for the event type. Additionally, a user may configure the individual user-level default handler for an event without affecting the system-level default handler or the default handler for another user for that event.

According to another aspect of the present disclosure, users may quickly view and update the default handlers associated with different event types through a user interface at a central location within the operating system. In one example, the different potential default handler applications for an event may be displayed to the user in a single view, allowing the user to make a rapid and informed decision regarding the default handler for that event. Similarly, within the operating system framework a user may select an installed application to view every supported event types supported by the application. As another example, the operating system may allow a user to view the events that have multiple potential handlers installed on the computer.

According to yet another aspect of the present disclosure, an application may communicate to the operating system the set of events for which the application may be a potential or preferred default handler program. For example, the application may provide a list of extensions, a list of protocols, and a list of other events, during the installation of the application on the computer. The operating system may receive and store the information from all potential default handlers registered on the computer, and may then update the provided user interfaces and other system utilities that allow users to define and maintain the default handler settings.

BRIEF DESCRIPTION OF THE DRAWINGS

Figure 1:
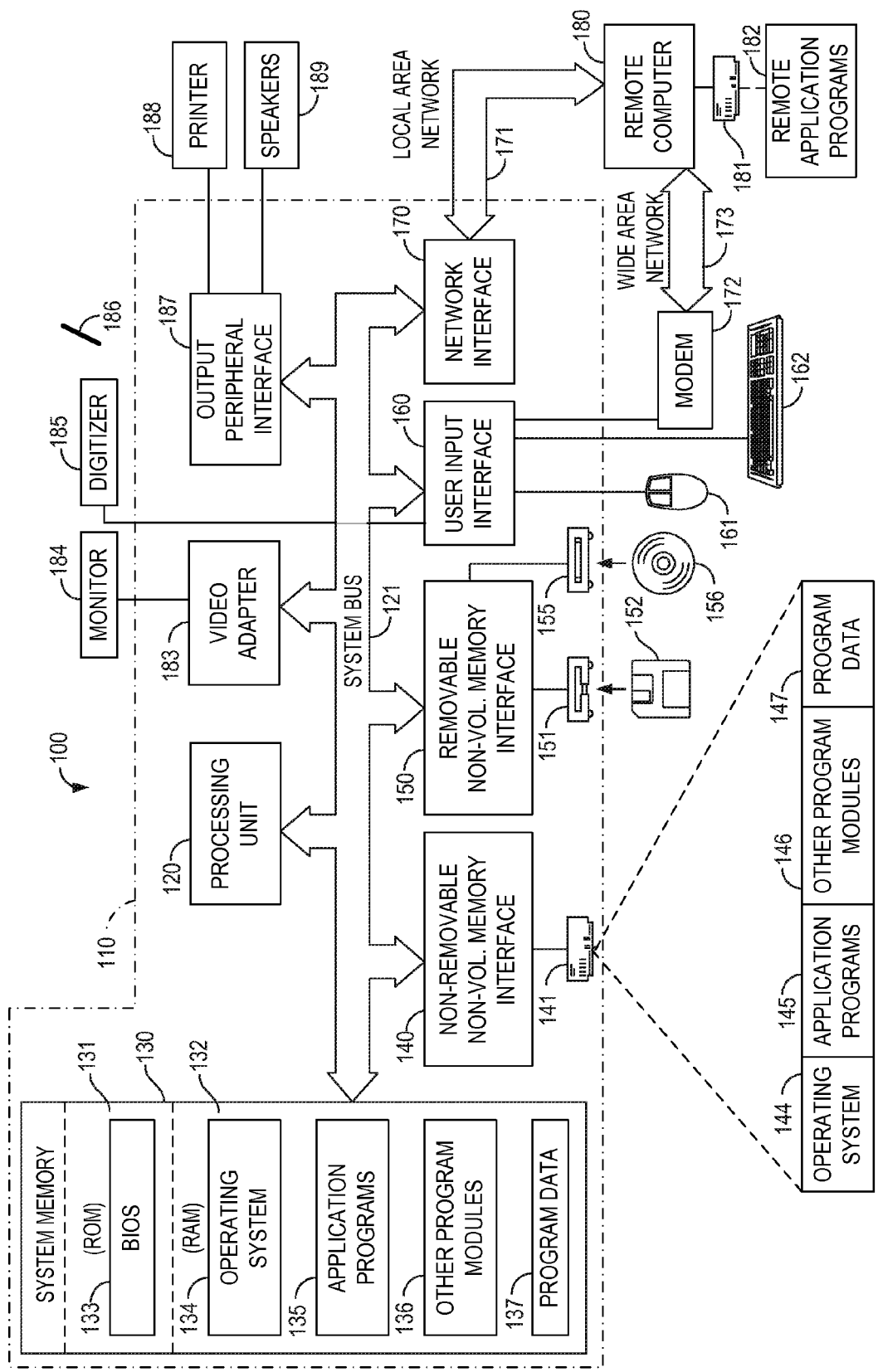
Figure 2:
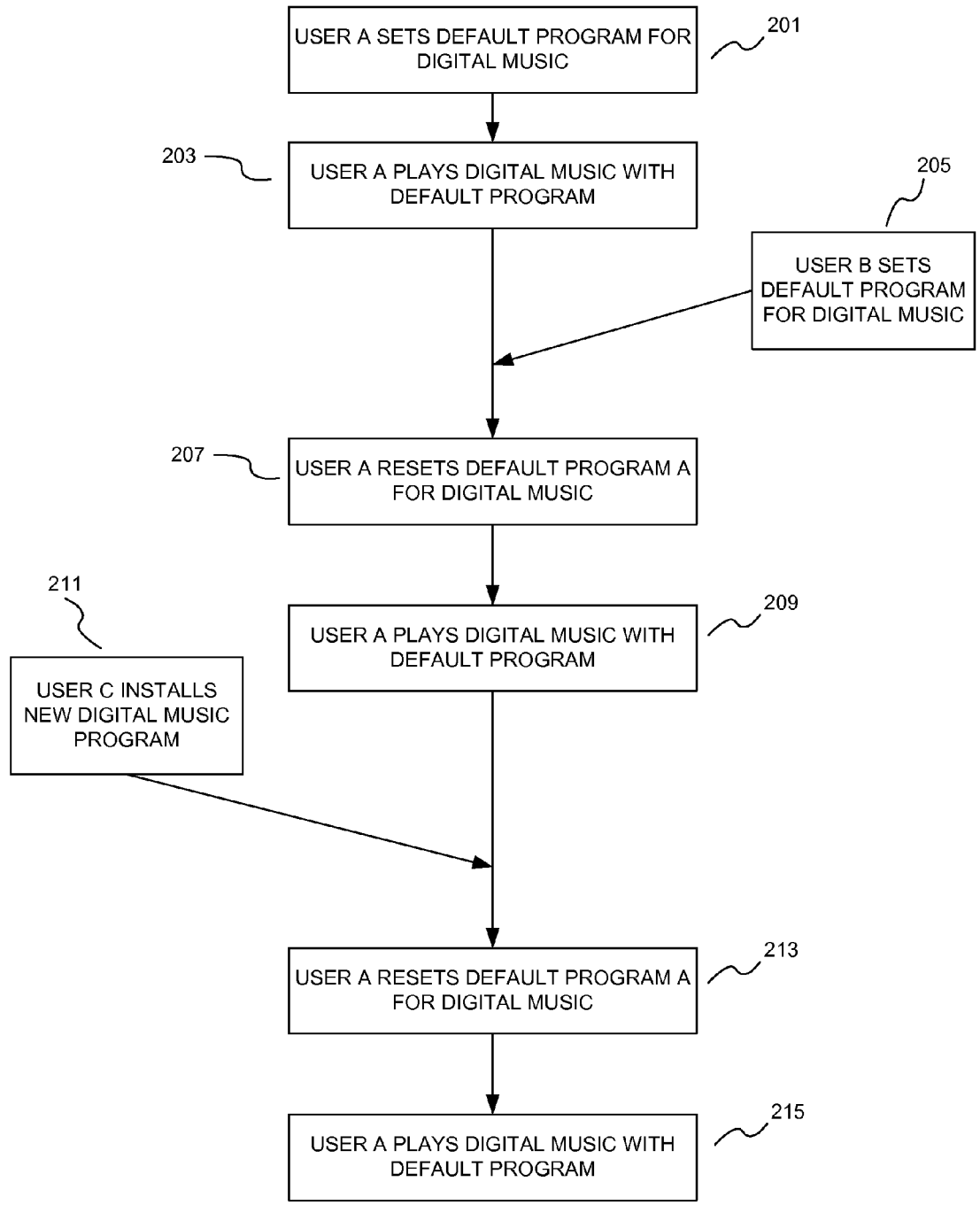
Figure 3:
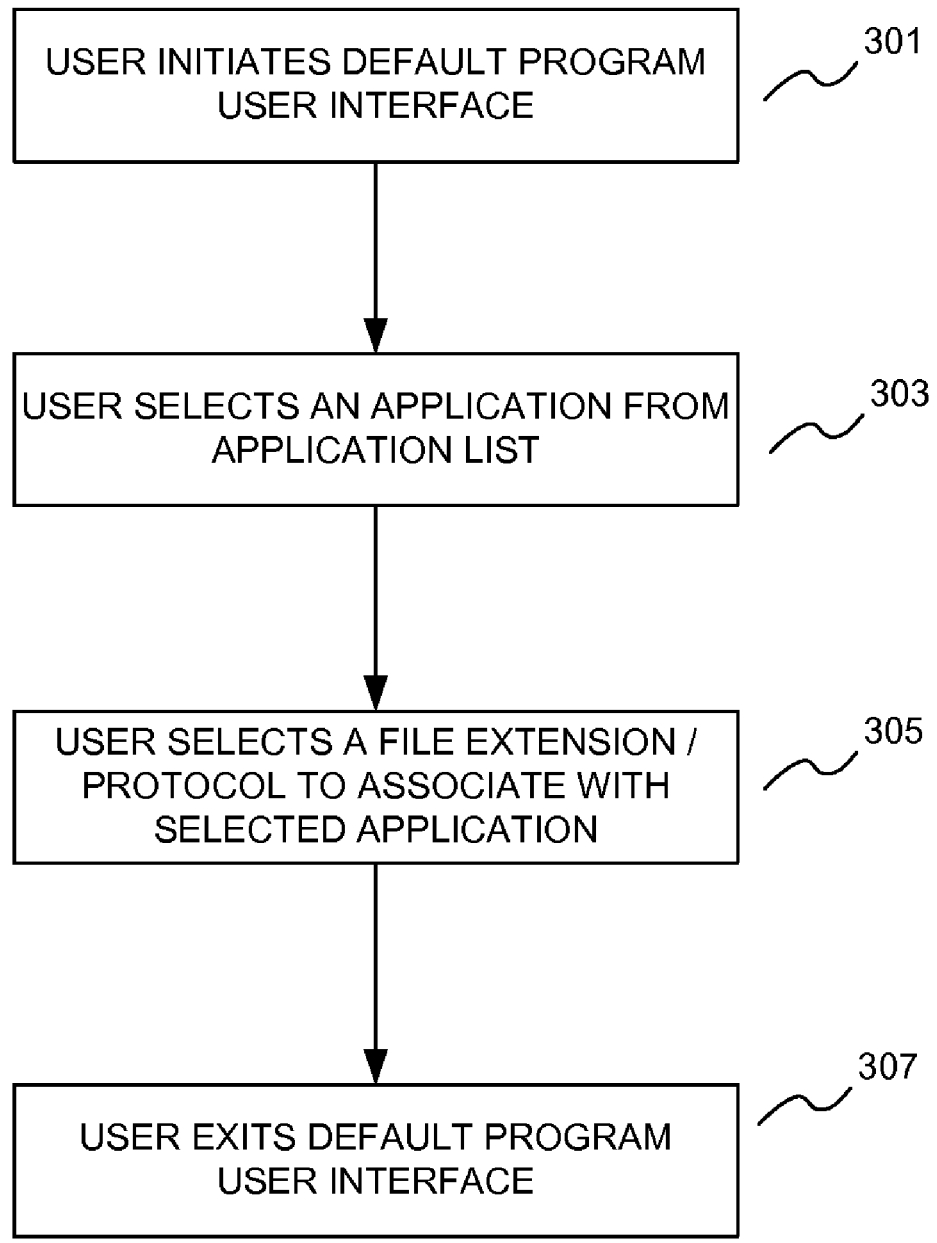
Figure 4:
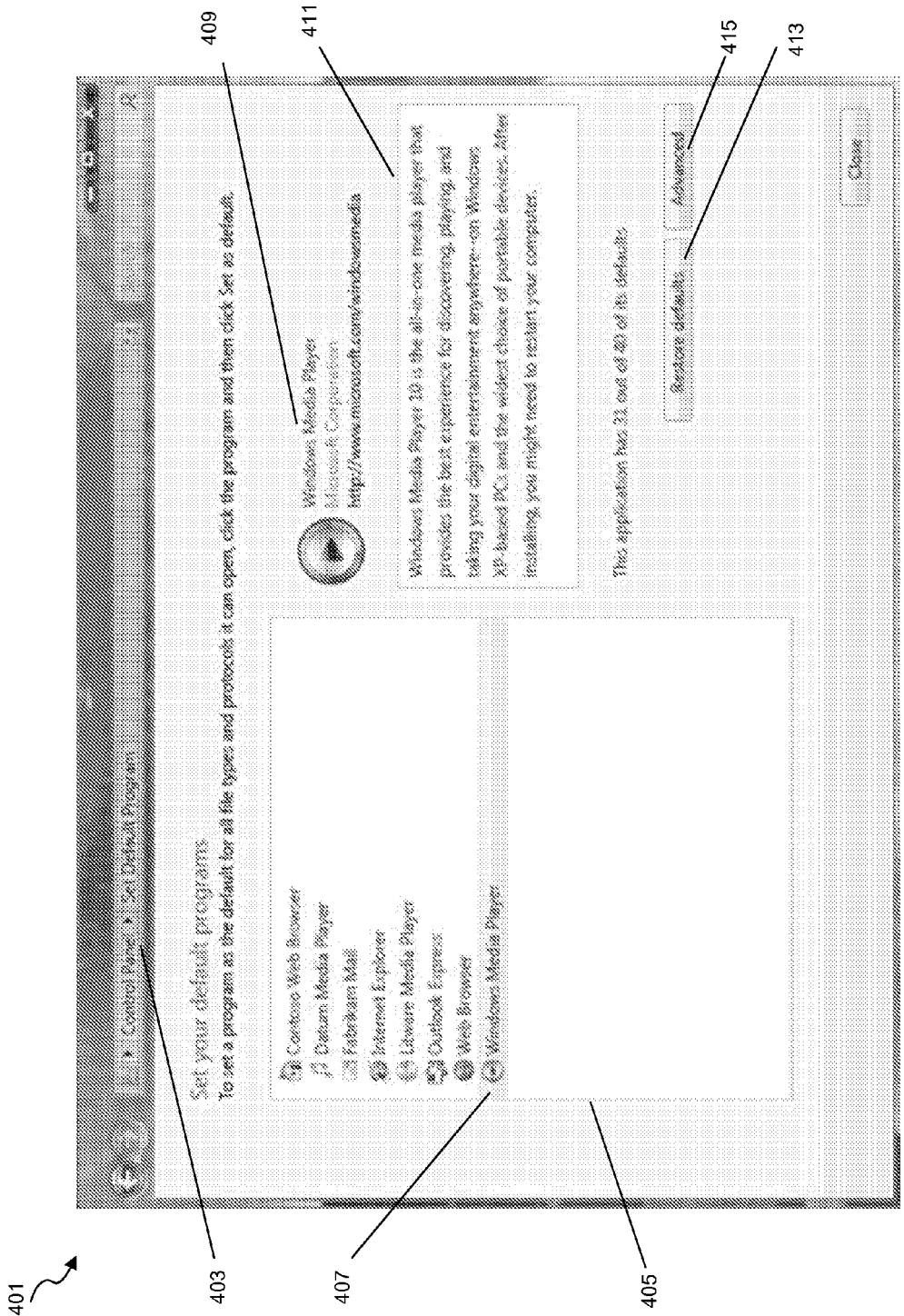
Figure 5:
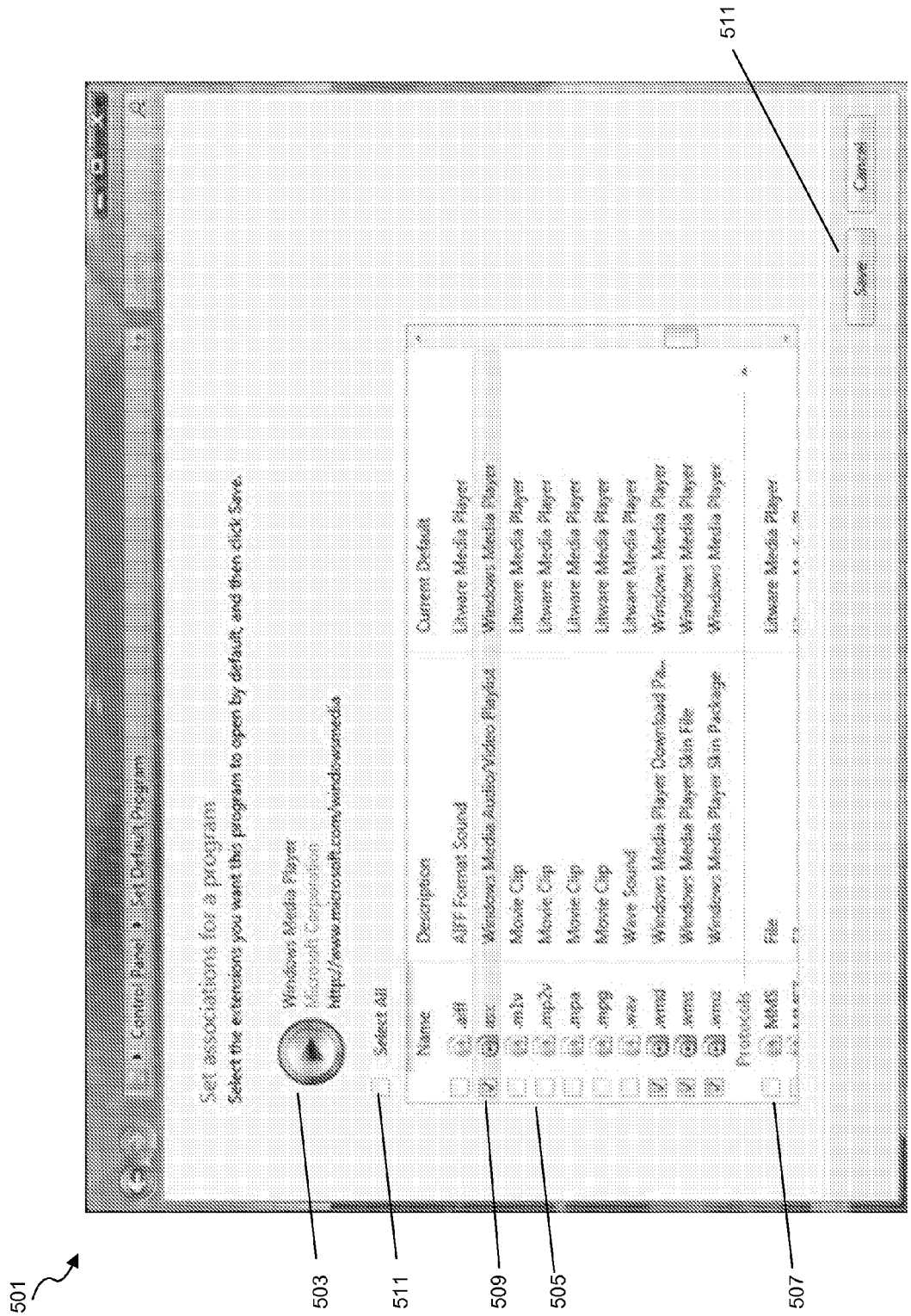
Figure 6:
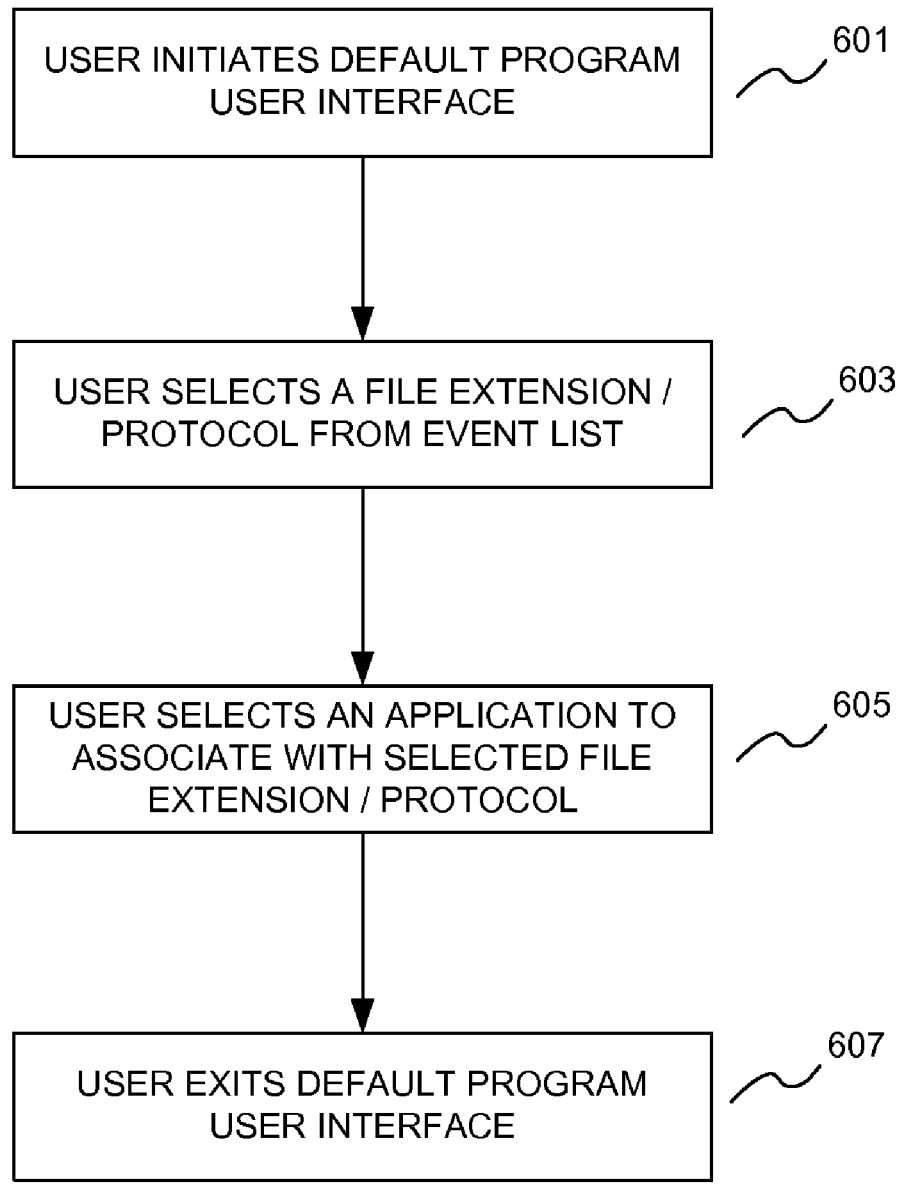
Figure 7:
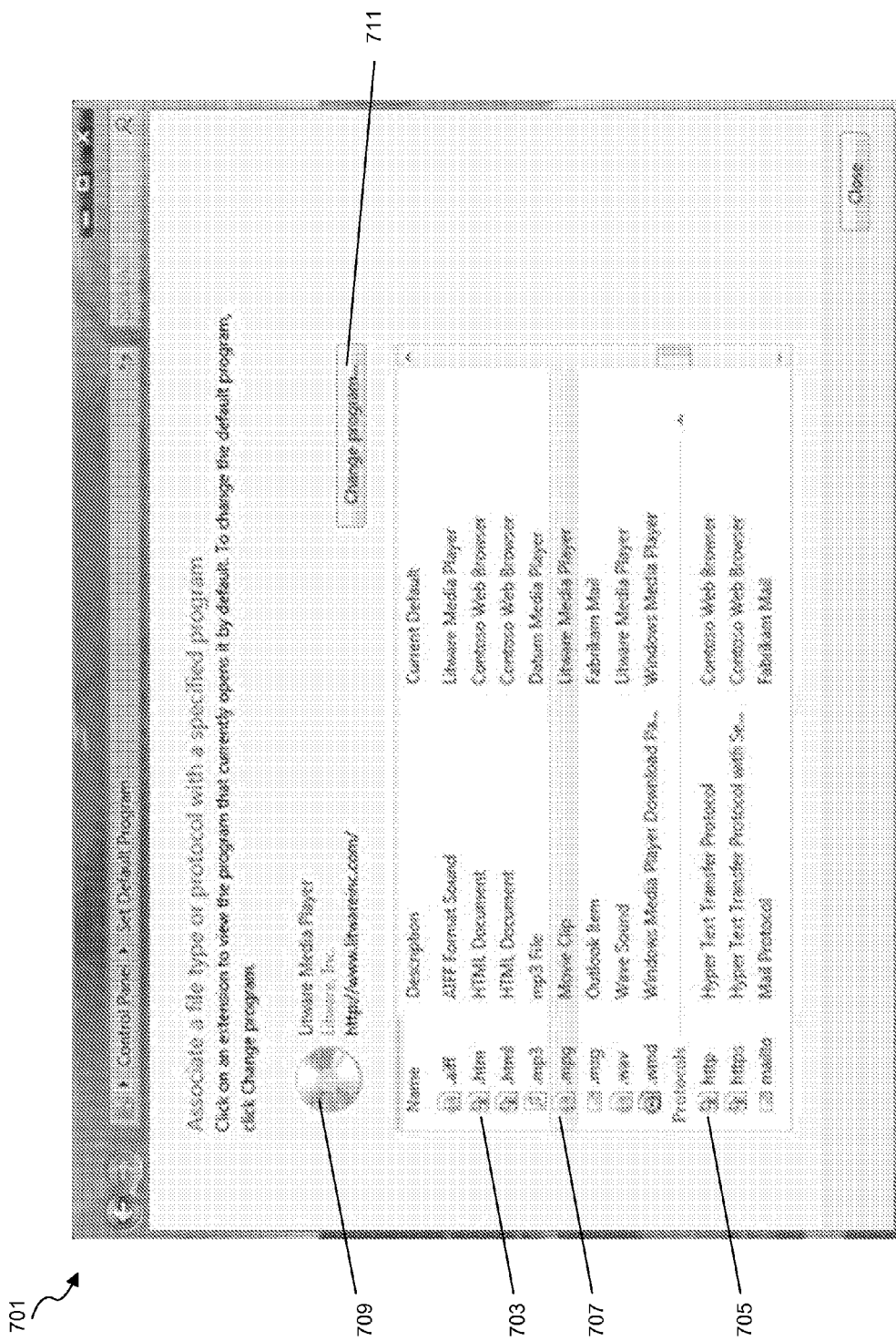
Figure 8:
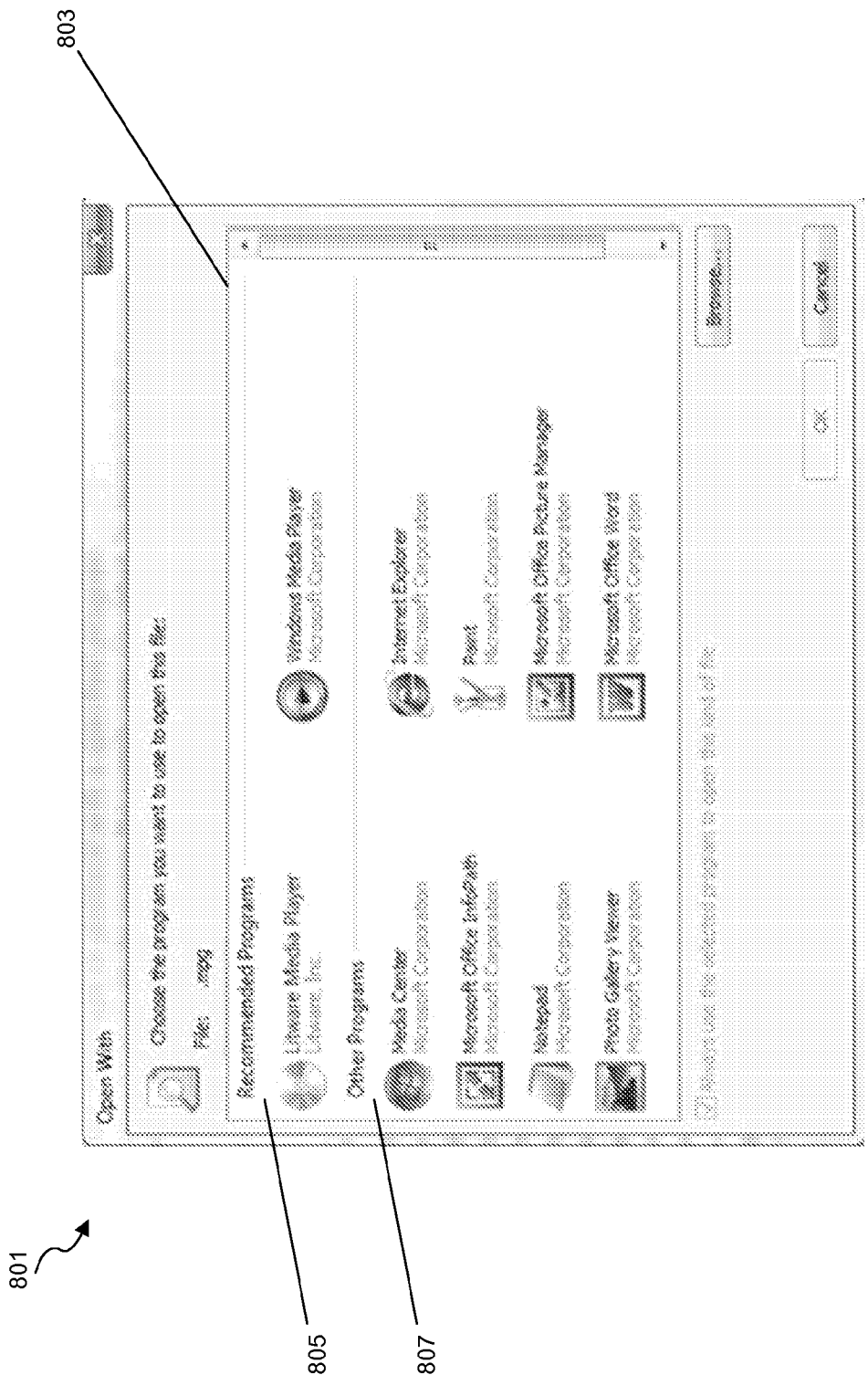
Figure 9:
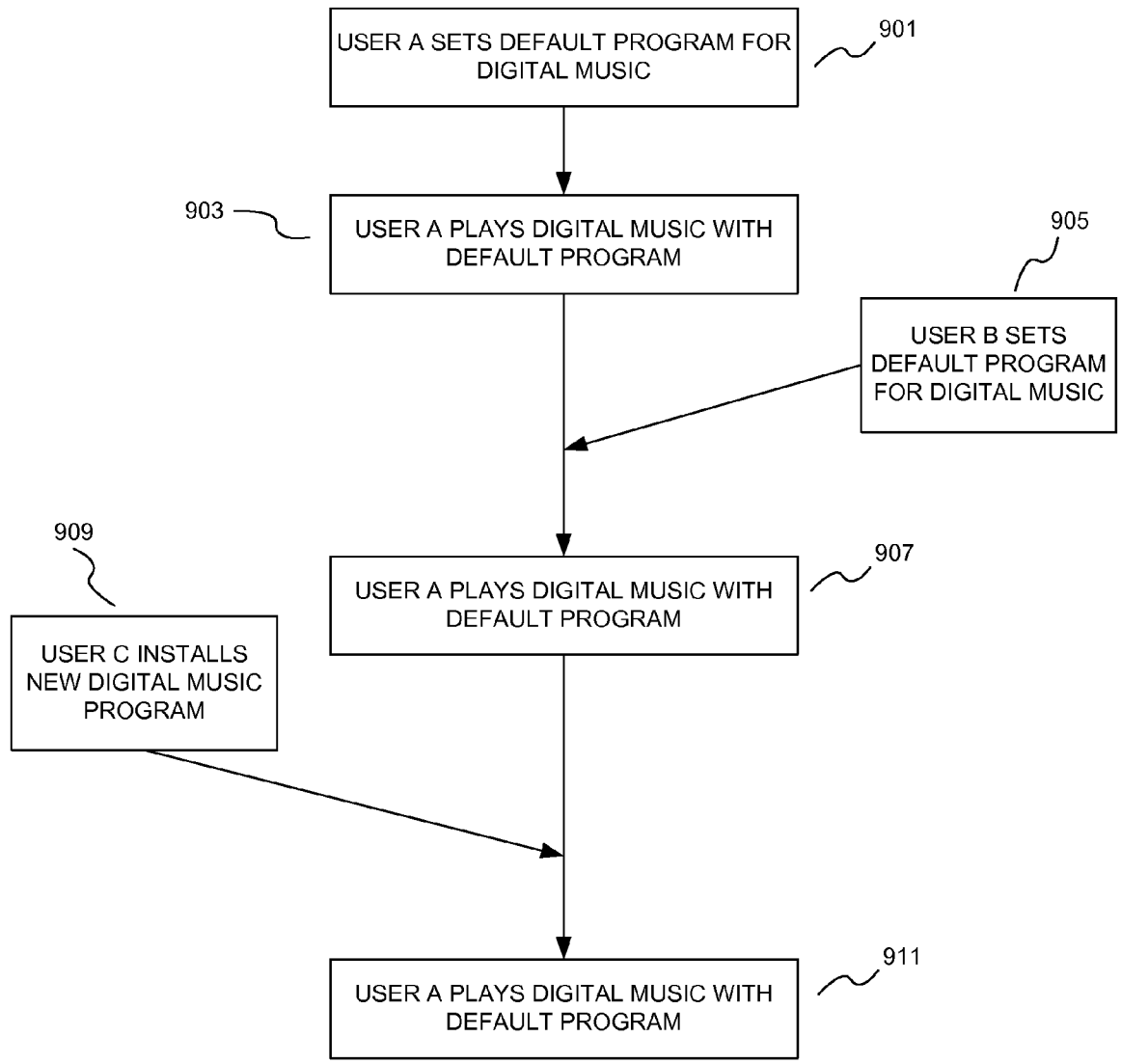

Having thus described the invention in general terms, reference will now be made to the accompanying drawings, which are not necessarily drawn to scale, and wherein:

FIG. 1 is a block diagram illustrating an operating environment in which one or more illustrative embodiments may be performed;

FIG. 2 is a flowchart showing illustrative user steps for defining a user default software application for playing music files on a computer, in accordance with a conventional operating system;

FIG. 3 is a flowchart showing user steps for associating an event with a software application in accordance with one or more illustrative aspects of the present disclosure;

FIG. 4 is a screenshot of a user interface relating to setting default software actions for events in accordance with one or more illustrative aspects of the present disclosure;

FIG. 5 is a screenshot of a user interface relating to setting default software actions for events in accordance with one or more illustrative aspects of the present disclosure;

FIG. 6 is a flowchart showing user steps for associating a file extension or protocol with a default software application in accordance with one or more illustrative aspects of the present disclosure;

FIG. 7 is a screenshot of a user interface relating to setting default software actions for events in accordance with one or more illustrative aspects of the present disclosure;

FIG. 8 is a screenshot of a user interface relating to setting default software actions for events in accordance with one or more illustrative aspects of the present disclosure; and FIG. 9 is a flowchart showing illustrative user steps for defining a user default software application for playing music files on a computer in accordance with one or more illustrative aspects of the present disclosure.

DETAILED DESCRIPTION OF ILLUSTRATIVE EMBODIMENTS

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention Illustrative Operating Environment FIG. 1 illustrates an example of a suitable computing environment 100 in which the invention may be implemented. The computing environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers; server computers; portable and handheld devices such as personal digital assistants (PDAs), tablet PCs or laptop PCs; multiprocessor systems; microprocessor-based systems; set top boxes; programmable consumer electronics; network PCs; minicomputers; mainframe computers; game consoles; distributed computing environments that include any of the above systems or devices; and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, DVD, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, universal serial bus (USB), or IEEE 1394 serial bus (FireWire). At least one monitor 184 or other type of display device may also be connected to the system bus 121 via an interface, such as a video adapter 183. The video adapter 183 may support advanced 3D graphics capabilities, in addition to having its own specialized processor and memory. Computer 110 may also include a digitizer 185 to allow a user to provide input using a stylus or other pen input device 186. In addition to the monitor, computers may also include other peripheral output devices such as speakers 189 and printer 188, which may be connected through an output peripheral interface 187.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 182 as residing on memory device 181. It will be appreciated that the network connections shown are exemplary and other means of establishing a communications link between the computers may be used.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Illustrative Embodiments

Illustrative embodiments described herein may assist a user in associating a default software application with a computer event. The illustrative embodiments described in these examples often refer to an event as a file extension (or file extension event) or a protocol (or protocol event). For example, an event may occur when a user double-clicks or otherwise opens a file with a specific file type or extension. Thus, a common event may occur when a user on a computer opens a music file with an ".MP3" extension. In response to this event, a default software application capable of playing music may be instantiated, or launched, to play the selected MP3 file. Similarly, another event may occur when a user opens a universal resource locator (URL) or other resource link in which a specific computer network protocol is specified. For example, an event may occur when a user clicks a resource link, such as a hyperlink starting with the string "HTTP" that is embedded in a document. In response to this event, a default software application, such as an internet browser, capable of receiving hypertext transfer protocol (HTTP) data from a remote location and rendering that data on the computer display screen, may be launched on the computer.

However, while illustrative embodiments may refer to file extension events or protocol events, aspects of the present disclosure are not limited to such event types. For example, an event may also occur when a hardware action is performed by a user on the computer, such as the insertion of a media disk in a disk drive. Such an event may also result in a software response, such as the launching of a default software application associated with the hardware event. Additionally, aspects of the present disclosure may be used to view and maintain configurable settings related to the software applications installed on the computer. For example, the number and position of entry points into the software application from the operating system shell may be controlled, such as by adding or removing an application link from a desktop view, start menu view, quick launch view, or system tray view, or other views supported by the computer operating system shell.

Referring to FIGS. 3-5, a flowchart (FIG. 3) and two screenshots of a user interface (FIGS. 4-5) are shown demonstrating illustrative steps for allowing a user to associate an event with a software application. In step 301, a user initiates a default program user interface (UI), such as the Set Default Program UI view 401. User interface view 401 may be provided by the operating system, for example, within the Control Panel menu of a Microsoft Windows® brand operating system, and may include an address tool bar 403 to indicate to the user the location of the UI view 401 within the operating system hierarchy. Upon initiating the Set Default Program UI view 401, the user may be presented with a list 405 of software applications installed on the computer. Program list 405 may contain a set of list items, with each list item having an application name and associated icon displayed in the list 405. Program list 405 may include a list item for every application installed on the computer, or may alternatively include only a subset of the installed applications, as determined by the operating system. For example, applications that are not presently selected as the default software application for any supported event may be excluded from the program list 405. Additionally, some software applications may not be registered with the operating system, other applications may be designed not to interact with any outside file types or protocols, and still other applications may accept no external input at all and thus might not be capable of acting as a default handler for any event. The operating system may use any of the above-described criteria to determine that an installed application should be included or excluded from the program list 405, or may exclude an application from the list based on a determination that the application is unlikely to be chosen as a default handler for the supported software or hardware events.

In step 303, the user selects a software application from the program list 405. For example, in FIG. 4, the Windows® Media Player list item 407 has been selected from the program list 405. Upon selecting list item 407, the user interface view 401 may display detailed information 409 associated with the selected program 407, and a description 411 of the application and the different types of events (e.g., extensions, protocols) that may be associated with the application 407. The detailed information 409 may include, for example, the full name of the program, the software manufacturer, an icon associated with the program, the location of a program executable within the computer file system, and/or a URL associated with the program. The type and the content of detailed information 409 provided may depend on the selected program 407, since the operating system may know certain information for some programs but not others, and since certain data fields may apply to some programs but not others.

The application description 411 may contain a description of the various items for each event for which the selected program 407 is capable of being the default handler. Description 411 may include a text description to inform the user of the functionality supported by the application, in general or specific terms. Description 411 may also include other information relating to reliability, performance, or compatibility with different protocols, file types, other systems, or software programs. Description 411, may also include, for example, a list of file extensions (e.g., .DOC, .TXT, .HTML) or protocols (e.g., HTTP, HTTPS). For example, the description 411 may mention support for "JPG" images, informing the user the selected program 407 is one that is capable of being the default application associated with JPEG images for that user, so that the next time she opens a JPEG image, the operating system may automatically launch Microsoft Windows® Media Player 407 to display the selected image. The "Restore All Defaults" button 413 allows a user to easily set the selected application as the default handler program for all events for which the selected program is capable of being the default handler. Thus, after selecting a program 407 and reviewing the description 411, the user may decide that program 407 should be the default handler program for every type of event it supports and select (e.g., by clicking) button 413 to set user-level defaults for all events associated with program 407. Thus, users may quickly designate such "preferred" programs as defaults for as many events as possible without even needing to view the different event types. Alternatively, the user may individually examine and set defaults for the different events supported by program 407, as is described below in relation to FIGS. 5, 7, and 8.

As described above, the user may designate user-level default handler programs for events, which are distinct from the system-level default handler programs for the same events. The user may accept the system-level defaults as their personal defaults, or may change one or more of the system-level defaults by creating user-level defaults which supersede the system-level defaults. All defaults in this combination would apply equally to the user, although the system-level may be less reliable to an individual user, since the system-level defaults may be more likely to be changed by another user or application.

Rather than setting all supported defaults for the selected program 407 with the restore all defaults button 413, a user may instead want only some event types associated with program 407. Thus, to view and/or set the specific defaults for the selected program 407, the user may select the "Advanced" button 415, to initiate the Set Default Program UI view 501, shown in FIG. 5. In certain embodiments, the user may also double-click on the application name or icon in program list 405 to display the Set Default Program UI view 501 for the selected application. View 501 may be generated using information stored in the operating system memory (e.g., disk storage, system registry) relating to the selected application 503. For example, user interface view 501 may contain detailed information describing the selected application 503. This detailed information may include the same detailed information 409 displayed in view 401, or may alternatively display a different set of information fields tailored to the user context. Additionally, user interface view 501 may contain a file extension list 505 and a protocol list 507, each of which may be populated with information stored in the operating system memory describing the events compatible with the selected application 503. Thus, each extension in the file extension list 505 may correspond to a file type compatible with the selected application 503, so that application 503 is capable of being the default handler for that file extension. Similarly, protocol list 507 may contain the list of network protocols through which the selected application 503 can communicate. Thus, the selected application 503 may be capable of being the default handler for each protocol in protocol list 507.

While, in this example, the lists 505 and 507 include every file type and protocol supported by the selected application 503, in certain other embodiments the lists 505 and 507 might only include certain preferred file types and protocols as determined by the application. For example, although a simple text editor may be capable of being the default application for image files, such a configuration may be undesirable for the user and/or the application. Thus, in this example, the simple text editor would communicate a list of preferred file types, protocols, and other events, to the operating system, for example, during installation. These lists may be distinct from the total set of file types, protocols, and other events supported by the application. Thus, the lists 505 and 507 may include only the preferred events, may include all supported events, or may include separated sub-lists displayed in each list view separating the preferred events from the events that are merely supported by the application.

In step 305, the user selects a file extension or protocol from the extension list 505 or protocol list 507 to associate the extension or protocol with the selected application 503. This step may occur in one of several different ways. For example, the user may click on a checkbox in the extension list 505 or protocol list 507, to designate the selected application 503 as the default handler for the event type associated with the checkbox. Thus, by checking checkbox 509, the user is setting Microsoft Windows® Media Player as the default application for an ASX event (e.g., the user opening a Windows® Media Player Playlist on the computer). The user may also click the "Select All" checkbox 511 to make the selected program 503 the default handler for all events in the extension list 505 and protocol list 507. This provides the potential advantages to users of quickly being able to select their favorite applications as the default handlers for every type of event supported by the application.

In step 307, the user exits the Set Default Program UI after saving any changes to the user-level default handler settings, for example, by clicking the "Save" button 511 before exiting the user interface. The user may instead choose to exit the user interface without updating any default handler settings.

Referring to FIGS. 6-7, a flowchart (FIG. 6) and a screenshot of a user interface (FIG. 7) are shown demonstrating illustrative steps for allowing a user to select a specific event type, and select the default software application with which the event type should be associated. In step 601, a user initiates yet a different view 701 of the Set Default Program UI. As with other views of the Set Default Program UI, view 701 may be may be directly accessible through a control panel of the computer operating system. User interface view 701 may also be displayed in response to user actions in the previous views 401 and 501, for example, when a user double-clicks a specific event in the extension list 505 or protocol list 507.

User interface view 701 may list the current user default applications for all file extensions and protocols known to the operating system. For each event type listed in the extension list 703 and the protocol list 705, the current default application and a brief description of that application may be displayed with the event type. View 701 may also support filtering of lists 703 and 705, either automatic filter performed by the operating system, or manual filtering performed by the user, so that the user is not overwhelmed by a large number of irrelevant event types. For example, the extension list 703 and protocol list 705 might only include the file types and protocols which have multiple compatible applications installed on the computer. Additionally, a user may sort the lists 703 and 705, for example, alphabetically by the current default application or extension, allowing a user to quickly find a desired file extension or protocol.

In step 603, the user selects a file extension event from the extension list 703 or a protocol event from the protocol list 705. Upon selecting an event 707 from lists 703 and 705, detailed information about the current default program 709 is displayed for the user. Thus, by clicking on the "MPG" extension event 707, in the extension list 703, the user can learn more information about the current default application for MPG files.

In step 605, the user changes the default program for an event type by selecting an application to associate with the selected event 707. To change the current default program 709, the user may click the "Change" button 711. After clicking button 711, the user interface 801 shown in FIG. 8 may be displayed showing the set of applications 803 installed on the computer that are capable of supporting the selected event type. The user may then select any of the compatible applications as the new default handler program for the selected event type. The list of applications 803 in user interface 801 may include a sub-list of recommended applications 805 and a list of other programs 807 that may also support the elected event type. In certain embodiments, the list of applications 803 from which the user may select a new default might not include every installed application compatible with the event type. Instead, the new default application list 803 might only include applications that have registered with the operating system and/or applications that have communicated to the operating system that the selected event type is a preferred event for the application. For example, as mentioned above, while an MPG file may be compatible with a simple text editor, a digital video file such as an MPG is not likely to be a preferred event for the text editor application. Thus, the text editor application might not be displayed in the list of compatible applications.

In step 607, the user exits the Set Default Program UI after saving any changes to the user-level default handler program settings, for example, by clicking the "Done" button 713 before exiting the user interface. The user may instead choose to exit the user interface without updating any default handler settings.

Referring to FIG. 9, a flowchart is shown demonstrating illustrative steps for allowing a user to define and maintain a default software application for playing digital music files on the computer. FIG. 9 describes a similar user scenario performed by the conventional system of FIG. 2, but using one or more aspects of the disclosure described herein, thus illustrating some of the advantages of the present disclosure. In step 901, User A uses the Set Default Program UI described above to associate an event, for example, the opening of an MP3 digital music file, with a software application, e.g., Windows® Media Player. The associated software application will subsequently be the default handler program for all of User A's MP3 events. Thus, in step 903, when User A opens an MP3 file, the operating system will automatically launch this default handler application to play the MP3.

In step 905, a different user on the same computer, User B, defines her own default handler application for MP3 events. As described above, computer operating systems may support many different ways for defining default handlers. In certain scenarios, User B may define her own MP3 default handler (e.g., Apple iTunes) using the Set Default Program UI described above. Thus, only the user-level default handler for User B might be changed. However, in certain other scenarios, User B may define a new MP3 handler in a way that may overwrite the system-level settings for MP3 events. For example, User B may directly or indirectly, though an operating system utility or an installation process, overwrite registry data corresponding to the system-level default handler for MP3 files. As another example, User B may update the default handler by executing careless or malicious embedded code in User B's preferred digital music application. Thus, intentional or inadvertently, User B may overwrite the system-level defaults, thereby effecting all system users that rely on these system-level default handlers.

In step 907, User A returns to the computer and opens another MP3 file. Unlike the conventional system described in conjunction with FIG. 2, User A does not need to reset her preferred digital music application as the default handler for MP3 files. Since, in step 901, User A set her user-level MP3 default handler to her preferred digital music application, her default persists and supersedes any change made to the system-level MP3 default handler. Thus, User B may change her own user-level defaults settings, and even the system-level default settings, without affecting User A's default handler for MP3s.

In step 909, a third user on the same computer, User C, installs a new digital music software application on the computer. Unlike in the conventional system described in FIG. 2, the new application may easily register default handler information with the operating system, such as preferred event types and supported events, without necessarily overwriting the current system or user-level defaults. To facilitate this registration, the operating system may supply one or more application program interfaces (APIs), to allow an installing application to specify a list of extensions, protocols, and other events that the application supports. For example, the operating system may provide the following registration schema to an installing application, allowing the application to make its supported or preferred events (e.g., FileAssociations and UrlAssociations) available to users through the Set Default Program UI:

```
HKLM\%APPLICATIONCAPABILITYPATH%
    \FileAssociations
        .file-extension = REG_SZ "file-extension-progid"
    \UrlAssociations
        url-scheme = REG_SZ "url-scheme-progid"
    \Description
        text = ""
HKLM\Software\RegisteredApplications
    unique-app-name = REG_SZ
    "%APPLICATIONCAPABILITYPATH%".
```

An installing application may then register its supported defaults using the schema format provided by the operating system. For example, the illustrative Contoso WebBrowser application may choose to incorporate the following registry keys into its installation process:

```
HKLM\software\Contoso\WebBrowser\Capabilities
    Description ="The award-winning Web browser is better than
    ever. Search the internet in second and find anything you want.
    Use integrated tabs and new phishing detectors to enhance your
    internet experience ."
    \FileAssociations
        .htm = ContosoHTML
        .html = ContosoHTML
        .shtml = ContosoHTML
        .xht = ContosoHTML
        .xhtml = ContosoHTML
    \UrlAssociations
        http = Contoso.Url
        https = Contoso.Url
        ftp = Contoso.Url
    \Startmenu
        StartmenuInternet = "Contoso.exe"
HKLM\software\RegisteredApplications
    Contoso.WebBrowser.1.06 =
    software\Contoso\WebBrowser\Capabilities
```

An additional potential advantage of this application registration schema is that each application may write and control its default handler information within its own registry sub-tree. Thus, a careless or malicious application is less likely to overwrite default handler information registered by another application. Another advantage of the present disclosure is that installing applications may choose not to overwrite the system-level default handlers for their compatible event types, but may instead simply register their schema and leave the system-level defaults unchanged. This may appeal to both applications and users, providing applications a simple way to advertise their capabilities to users within the Set Default Program UI, while not subjecting users to frequent unwanted changes of the system-level defaults they might rely on.

In step 911, User A once again returns to the computer and opens another MP3 file. Once again, User A's user-level MP3 default handler set in step 901 may immediately launch when User A opens the MP3. Even if the application installed in step 909 maliciously or inadvertently changed User C's user-level default handler and/or the system-level default handler for MP3 files, User A's user-level default will persist and supersede any change made to the system-level default MP3 handler.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for identifying an application as a default application to excute an event, the method comprising:
   presenting a list of a plurality of applications that are installed on a computing device;
   receiving a selection of the application from among the list of the plurality of applications;
   in response to the selection of the application, presenting information that describes the application, wherein the information includes an application identifier, a software-manufacturer identifier, a location of the application within a computer file system, and a text description of functionality supported by the application;
   receiving a selection of a settings button that is displayed together with the information that describes the application; and
   in response to the selection of the settings button, displaying an event list including a plurality of event items, each event item corresponding to a respective event that is executable using the application,
   wherein the event list is displayed without invoking the application running in the operating system, and
   wherein the event list identifies events for which the application is designated as the default application and events for which the application is not designated as the default application.

2. One or more computer storage media storing computer executable instructions for providing a user interface that identifies a software application as a default application to execute an event, said user interface comprising:
   an application list displaying a plurality of software applications installed on a computer having an operating system, wherein the user interface allows selection of an application from among the plurality of software applications;
   an application-description portion that, upon selection of the application from among the plurality of software applications, presents information describing the application, wherein the portion is configured to present an application identifier, a software-manufacturer identifier, a location of the application within a computer file system, and a text description of functionality supported by the application; and an event list displaying one or more event items, each event item corresponding to a respective event that is executable using the application, wherein the event list is displayed, without invoking the application running in the operating system, upon selection of an advanced-settings button that is displayed together with the application-description portion, and wherein the event list includes an application-associations list, which lists one or more extensions that the application opens by default.

3. The computer storage media of claim 2, wherein said event list comprises a list of items, each of the items corresponding to a computer file type.

4. The computer storage media of claim 2, wherein said event list comprises a list of entry points in the operating system.

5. The computer storage media of claim 2, wherein said event list comprises a list of computer network protocols.

6. The computer storage media of claim 2, wherein said event list comprises a list of hardware actions capable of being initiated by a user of said computer.

7. The computer storage media of claim 2, wherein upon selection of an event from said event list, an operating-system command is executed to configure said computer to launch the application upon an occurrence of said event.

8. The computer storage media of claim 7, wherein upon execution of said operating-system command, said computer is configured to launch the application upon the occurrence of said event, and wherein launching the application is a user-specific preference that is applied when the computer is being operating by said user during the occurrence of said event.

9. The computer storage media of claim 7, wherein said event list comprises:

a list of file extensions that are supportable by the application; and a list of preferred file extensions that is specified by the application when the application registers with the operating system and that is a subset of said list of file extensions.

10. The computer storage media of claim 7, wherein said event list comprises:

a list of computer network protocols that are supportable by the application; and a list of preferred computer network protocols that is specified by the application when the application registers with the operating system and that is a subset of said list of computer network protocols.

11. Computer storage media comprising computer-executable instructions that, when executed, provide a user interface for identifying a software application as a default application to execute an event, the user interface comprising:

a first event list identifying file extensions and protocols known to an operating system, wherein an event listed on the event list is selectable to designate a default application to be used to execute the event, and wherein the event list is filtered to exclude from presentation a file extension that is known to the operating system and that is not executable with more than one application;

a current-default list identifying a respective default application that is established for each file extension and each protocol included on the event list;

an application list displaying a plurality of software applications installed on a computer having an operating system, wherein the user interface allows selection of an application from among the plurality of software applications;

an application-description portion that, upon selection of the application from among the plurality of software applications, presents information describing the application, wherein the portion is configured to present an application identifier, a software-manufacturer identifier, a location of the application within a computer file system, and a text description of functionality supported by the application; and a second event list displaying one or more event items, each event item corresponding to a respective event that is executable using the application, wherein the event list is displayed, without invoking the application running in the operating system, upon selection of an advanced-settings button that is displayed together with the application-description portion, and wherein the event list includes an application-associations list, which lists one or more extensions that the application opens by default.

* * * * *